United States Patent
Cameron et al.

(10) Patent No.: US 7,388,874 B2
(45) Date of Patent: Jun. 17, 2008

(54) PROTECTION SWITCHING METHODS AND SYSTEMS FOR ELECTRONIC DEVICES

(75) Inventors: Herb Cameron, Arnprior (CA); Peter Cameron Dippel, Stittsville (CA)

(73) Assignee: Alcatel Lucent, Paris (FR)

( * ) Notice: Subject to any disclaimer, the term of this patent is extended or adjusted under 35 U.S.C. 154(b) by 778 days.

(21) Appl. No.: 10/834,785

(22) Filed: Apr. 29, 2004

(65) Prior Publication Data

US 2005/0243497 A1   Nov. 3, 2005

(51) Int. Cl.
  *H04L 12/28* (2006.01)
  *H04L 1/22* (2006.01)
(52) U.S. Cl. .......................... 370/419; 714/27
(58) Field of Classification Search ............... None
  See application file for complete search history.

(56) References Cited

U.S. PATENT DOCUMENTS

| | | | |
|---|---|---|---|
| 7,068,712 B1 * | 6/2006 | Zang et al. | 375/222 |
| 2002/0097462 A1 * | 7/2002 | Koyano et al. | 359/119 |
| 2002/0110136 A1 | 8/2002 | Wakai et al. | |
| 2003/0172319 A1 * | 9/2003 | Ryhorchuk et al. | 714/27 |
| 2005/0180410 A1 * | 8/2005 | Pepenella | 370/386 |

\* cited by examiner

*Primary Examiner*—Huy D. Vu
*Assistant Examiner*—Clemence Han
(74) *Attorney, Agent, or Firm*—Barnes & Thornburg LLP (57) ABSTRACT

Per-interface electronic device protection switching systems and methods are disclosed. An electronic device and each communication line interface provided in the device are monitored, and device information and interface information are generated. The device and interface information is periodically sent to a mate electronic device in a protection group to which the electronic device belongs. Mate device information and mate interface information are also received by the device from the mate device. Activity states of each device interface are controlled based on at least one of the device information, the interface information, the mate device information, and the mate interface information.

42 Claims, 6 Drawing Sheets

| Byte | Field | Size | Description |
|---|---|---|---|
| 0 | Version | 1 byte | Identifies the message version. |
| 1 | Unused | 1 byte | For byte alignment |
| 2,3 | Device Demerits | 2 bytes | Identifies the demerits points against the device. |
| 4 | Device Activity Action | 1 bit | 1 = Release Activity to the mate device |
| | Interface 1 Activity | 2 bits | 00 = APS not configured<br>01 = Interface Inactive<br>10 = Interface Active. |
| | Interface 1 Activity Action | 1 bit | 1 = Release Activity to the mate interface. |
| | Interface 2 Activity | 2 bit | 00 = APS not configured<br>01 = Interface Inactive<br>10 = Interface Active. |
| | Interface 2 Activity Action | 1 bit | 1 = Release Activity to the mate interface. |
| | Interface 3 Activity | 2 bits | 00 = APS not configured<br>01 = Interface Inactive<br>10 = Interface Active. |
| | Interface 3 Activity Action | 1 bit | 1 = Release Activity to the mate interface. |
| | Interface 4 Activity | 2 bits | 00 = APS not configured<br>01 = Interface Inactive<br>10 = Interface Active. |
| | Interface 4 Activity Action | 1 bit | 1 = Release Activity to the mate interface. |
| 5 | Unused | 1 byte | For byte alignment |
| 6,7 | Interface 1 Status | 2 bytes | Interface 1 status bitmap. |
| 8,9 | Interface 2 Status | 2 bytes | Interface 2 status bitmap. |
| 10,11 | Interface 3 Status | 2 bytes | Interface 3 status bitmap. |
| 12,13 | Interface 4 Status | 2 bytes | Interface 4 status bitmap. |

FIG. 7

| Interface | Activity switch | Rule |
|---|---|---|
| Working | Active to Inactive | When instructed to release activity by the protection interface. |
| Working | Inactive to Active | Whenever a mate message indicates that the protection interface is inactive.<br>Whenever the protection device has failed or is not present. |
| Protection | Active to Inactive | Whenever the 1+1 APS SM on the protection device determines that the protection interface should be inactive.<br>When the working interface indicates that it is active and the protection interface is also active. |
| Protection | Inactive to Active | Whenever the 1+1 APS SM on the protection device determines that the protection interface should be active, provided that the working interface is inactive.<br>Whenever the working device has failed or is not present. |

PROTECTION SWITCHING METHODS AND SYSTEMS FOR ELECTRONIC DEVICES

FIELD OF THE INVENTION

This invention relates generally to protection switching and, in particular, to protecting individual interfaces of electronic devices on a per interface basis.

BACKGROUND

Redundancy protection switching for electronic devices involves switching of activity between a working device and a protection device. The working device and the protection device are typically substantially identical devices, one of which is selected to be active at any time. In a communication network for instance, identical signals are transmitted over a working line and a protection line which connect working line cards and protection line cards in different switches. Although the working line and the working line cards are normally active, operation may be switched to the protection line and the protection line cards in the event of a failure of the working line or one of the working line cards.

This type of device-based protection switching causes all services supported on a working device to be switched to a protection device, and is therefore particularly suited to implementations in which a working device supports only one service, as in the case of a line card having a single interface, for example. However, for such devices as multiple-interface devices which support multiple services, device-based protection switching may unnecessarily switch all services to a protection device when one or more of the services remain operable on a working device. Instead of switching only failing services, some current multiple-interface devices provide only device redundancy and thus switch all device functions when any of the functions require switching.

An alternative protection switching system provides for per-port protection switching for line cards by switching line interface functionality independently of line termination functionality via a system midplane. In this type of system, line interfaces are separate from line cards. This technique is only feasible, however, for line cards having a midplane and separate line interfaces.

As those skilled in the art will appreciate, increasing interface densities in multiple-interface devices may reduce costs, in that resources in a single device may be shared between multiple interfaces. Multiple-interface devices may also provide further advantages, including increasing bandwidth through a switch, for example. Therefore, multiple-interface devices and per-interface protection switching techniques for such devices are becoming more important.

SUMMARY OF THE INVENTION

Embodiments of the invention support per-interface protection switching for electronic devices.

In a preferred embodiment, multiple-interface electronic devices exchange messages which are processed to determine when an active interface should be switched between a working device and a protection device.

According to one aspect of the invention, a protection switching system for an electronic device having at least one communication line interface is provided. The protection switching system includes a monitor configured to monitor each device interface, to generate interface information to be periodically sent to a mate electronic device in a protection group to which the electronic device belongs, and to receive mate interface information from the mate device. The mate device has a respective communication line interface corresponding to each device interface. The protection switching system also includes a controller configured to control activity states of each device interface based on at least one of the device interface information and the mate interface information.

In one embodiment, the monitor is further configured to monitor the electronic device, to generate device information to be periodically sent to the mate device, and to receive mate device information from the mate device. The controller may then be configured to control activity states of each device interface based on at least one of the device information, the interface information, the mate device information, and the mate interface information.

In one embodiment, the monitor calculates device demerit points based on monitored conditions of the device. The device information then includes the calculated demerit points.

The device information may also include device activity action information for providing equipment protection, by indicating whether the mate device is to assume an inactive state.

Interface information may include interface activity state information indicating an activity state of each device interface, and possibly interface activity action information indicating whether the mate interface corresponding to each device interface is to assume an inactive state.

Mate device and mate interface information may be substantially similar, and the controller may then control the device interfaces accordingly.

In another embodiment, the device information and the mate device information include health information indicating monitored health conditions of the device and the mate device. The controller may then control activity of each device interface such that each interface on the healthiest of the device and the mate device are in an active state.

Device and device interface activity states may also be controlled on the basis of whether the mate device is present.

According to a further embodiment, the monitor and the controller are implemented as a plurality of state machines. The plurality of state machines may include a device state machine configured to monitor the device and to generate the device information, a respective interface state machine configured to monitor each device interface and to generate the interface information, and a task state machine configured to dispatch the mate device information and the mate interface information to the device state machine and each interface state machine.

The invention also provides a protection switching system for a working electronic device having a plurality of working communication line interfaces and a protection device having a plurality of protection communication line interfaces for respectively protecting the plurality of working interfaces. The system includes a working device monitor configured to monitor each of the plurality of working interfaces, and to periodically send working interface information to the protection device, a protection device monitor configured to monitor each of the plurality of protection interfaces, and to periodically send protection interface information to the working device, and a controller configured to select as active interfaces one of each respective pair of the plurality of working interfaces and corresponding protection interfaces based on at least one of the working interface information and the protection interface information.

In one embodiment, the working device monitor is further configured to monitor the working device and to periodically send working device information and working interface information to the protection device, and the protection device monitor is further configured to monitor the protection electronic device and to periodically send protection interface information to the working device. In this case, the controller may be configured to select active interfaces based on at least one of the working device information, the working interface information, the protection device information, and the protection interface information.

The system may also include a selector controlled by the controller and connected to the plurality of working interfaces and the plurality of protection interfaces.

A protection switching method for an electronic device having at least one communication line interface is also provided, and includes monitoring each device interface, generating interface information to be periodically sent to a mate electronic device in a protection group to which the electronic device belongs, the mate device having a respective communication line interface corresponding to each device interface, receiving mate interface information periodically sent from the mate device to the device, and controlling activity states of the plurality of device interfaces based on at least one of the interface information and the mate interface information.

The method may also include monitoring the electronic device, generating device information to be periodically sent to the mate device, receiving mate device information and mate interface information periodically sent from the mate device to the device. Controlling may then include controlling activity states of the device interfaces based on at least one of the device information, the interface information, the mate device information, and the mate interface information.

According to one embodiment, controlling includes setting the plurality of device interfaces to an active state when the mate device information and the mate interface information have not been received within the predetermined time.

In another broad aspect, an electronic device is provided, and includes a plurality of communication line interfaces, a processor, and a computer-readable medium storing instructions for instantiating a plurality of state machines. The plurality of state machines preferably includes a device state machine configured to monitor the electronic device, to generate device information, and to control an activity state of the device, and a plurality of interface state machines configured to respectively monitor the plurality of interfaces, and to generate interface information. The device state machine is preferably further configured to generate and periodically send mate messages including the device information and the interface information to a mate electronic device, the mate device having a plurality of interfaces corresponding to the plurality of interfaces of the device, to receive from the mate device mate messages comprising mate device information and mate interface information, and to control an activity state of the device based on at least one of the device information and the mate device information. Each interface state machine is preferably further configured to control activity states of a corresponding one of the plurality of interfaces based on at least one of the device information, the interface information, the mate device information, and the mate interface information.

Other aspects and features of embodiments of the present invention will become apparent to those ordinarily skilled in the art upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
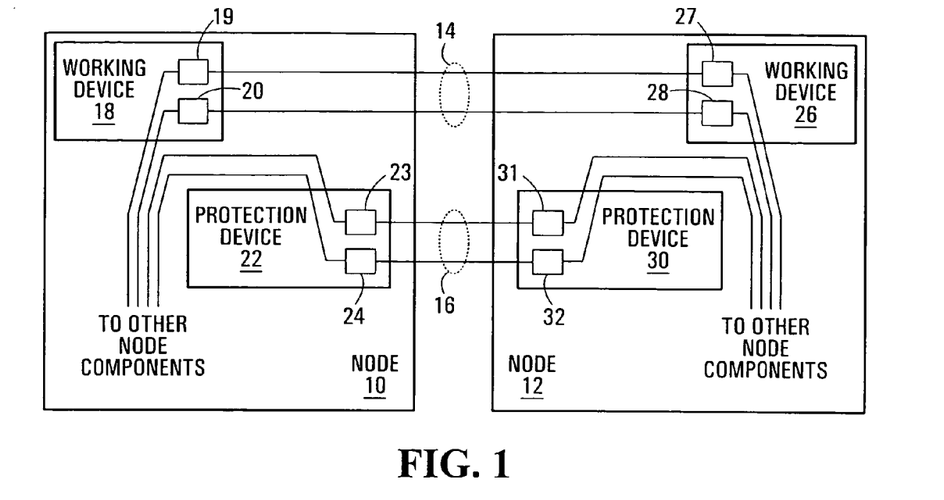
FIG. 1 is a block diagram of a system in which protection switching according to embodiments of the invention may be implemented.

FIG. 1 is a block diagram of a system in which protection switching according to embodiments of the invention may be implemented. It should be appreciated that the system of FIG. 1, as well as the contents of the other Figures, is intended solely for illustrative purposes. The present invention is in no way limited thereto.

The communication system of FIG. 1 includes nodes 10 and 12 connected by working lines 14 and protection lines 16. In particular, the working lines 14 connect interfaces 19, 20 in the working device 18 to respective interfaces 27, 28 in the working device 26. The protection lines similarly connect interfaces 23, 24 in the protection device 22 to respective interfaces 31, 32 in the protection device 30. As will be apparent to those skilled in the art, communication network nodes 10, 12 and the devices 18, 22, 26, 30 may include further components which have not been explicitly shown in FIG. 1 to avoid congestion in the drawing. Components which may be involved in protection switching are described in further detail below.

The nodes 10, 12 represent communication network elements which route communication signals through a communication network. In one illustrative embodiment, the nodes 10, 12 are switches which provide a switching fabric through which received communication signals are switched to route such signals to a destination. As such, although only one set of working and protection lines 14, 16 and one set of working and protection devices 18/22, 26/30 have been shown in FIG. 1, it should be appreciated that the nodes 10, 12 may operate in conjunction with multiple sets of working and protection lines and include multiple sets of working and protection devices. For example, interfaces through which communication signals may be exchanged with other nodes may also be provided in further working and protection devices in the nodes 10, 12. In the above example of a switch, devices are connected to the switching fabric, and communication signals may be switched between interfaces through the switching fabric.

The devices 18, 22, 26, 30 are electronic devices through which communication signals are sent and received by the nodes 10, 12. These devices include the interfaces 19, 20, 23, 24, 27, 28, 31, 32, which are also commonly referred to as ports or lines. References to interfaces herein should therefore be interpreted accordingly. The devices 18, 22, 26, 30 may also include further components to process communication signals, such as to format communication signals for transmission on the lines 14 and 16 according to particular communication protocols. In a preferred embodiment, the devices 18, 22, 26, 30 are line cards for a communication switch, and provide switching fabric interfaces (not shown) through which communication signals may be sent to and received from switching fabric in the switch or on one of the devices.

The interfaces 19, 20, 23, 24, 27, 28, 31, 32 represent physical interfaces to communication lines, the working lines 14 and the protection lines 16 in FIG. 1. Many different types of interface will be apparent to those skilled in the art. In a preferred embodiment, the interfaces for a working line and its corresponding protection line are of the same type. However, it should be appreciated that a working device may include different types of interface to support different types of line, where the same types of interface are provided for corresponding protection lines, for instance. Similarly, a node may include pairs of working/protection devices which include different types of interface than other working/protection device pairs.

In operation, a communication signal at a sending node, commonly referred to as the head-end signal, is continuously bridged to corresponding working and protection interfaces, so that the same payloads are transmitted identically to working and protection interfaces at a tail-end node or receiving node. At the receiving node, the working and protection signals are monitored independently and identically for failures. The receiving node chooses either the working or the protection interface as the one from which to select a signal, based on protection switching criteria. The interface from which the signal is selected is called the active interface, and the other interface is called the inactive interface.

With reference to FIG. 1, the devices 18/22 and 26/30 define protection groups. Each of a plurality of interfaces 23, 24 in the protection device 22 provides protection for respective ones of a plurality of interfaces 19, 20 in the working device 18. The interfaces 31, 32 similarly provide protection for the interfaces 27, 28, respectively. Where the working and protection lines 14, 16 support communications in only one direction, then one of the nodes 10, 12 is a sending node and the other is a receiving node. For bidirectional lines, or nodes which support separate unidirectional lines for communications in each direction, each node may be a sending node or a receiving node, depending upon communication direction.

Per-interface protection switching is commonly referred to as 1+1 APS (Automatic Protection Switching). Interface activity control is intended for electronic devices such as telecommunications cards, where there is one working card and one protection card. The working and protection cards may be based on substantially identical hardware having the same number of interfaces. Each interface on the protection card protects a respective interface on the working card. A working interface and a protection interface may have corresponding positions relative to other interfaces on the working card and the protection card.

Figure 2:
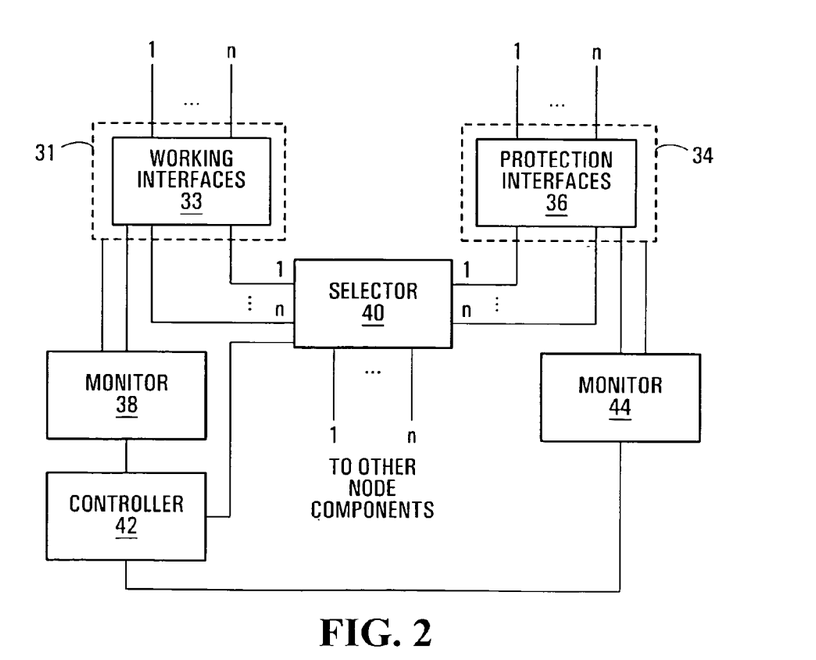
FIG. 2 is a block diagram of a protection switching system in accordance with an embodiment of the invention.

FIG. 2 is a block diagram of a protection switching system in accordance with an embodiment of the invention. As described above with reference to FIG. 1, the system of FIG. 2 is intended for illustrative purposes. The invention is in no way limited thereto.

The system of FIG. 2 includes n working interfaces 33 provided in a working electronic device 31, n protection interfaces 36 provided in a protection device 34, and a selector 40 connected to the working interfaces 33 and the protection interfaces 36. As shown, the system of FIG. 2 is scalable such that any number n of interfaces may be provided. A controller 42 is connected to monitors 38, 44 and the selector 40 to control the selection of active interfaces by the selector 40.

Examples of the working device 31, the working interfaces 33, the protection device 34, and the protection interfaces 36 have been described above. Each of the working interfaces 33 is protected by a corresponding one of the protection interfaces 36.

The selector 40 is controlled by the controller 42 to select one of each pair of a working interface and a protection interface as an active interface, based on selection criteria. The criteria for selecting an active interface may include, for example, the health of an interface and/or an electronic device, as determined by the monitors 38, 44, and an activity switching protocol. Health monitoring and interface selection are described in further detail below.

Although shown as separate components in FIG. 2, the functions of the monitors 38, 44, the controller 42, and the selector 40 may be divided differently than shown in FIG. 2. In one embodiment of the invention, for example, the selector 40 includes n controllable switches, and the functions of the monitors 38, 44 and the controller 42 are provided in software routines or modules. In another embodiment, the monitors 38, 44, the controller 42, and the selector 40 are all software-based.

According to a preferred embodiment of the invention, each of the electronic devices 31, 34 includes a processor. Each processor executes software which implements a respective one of the monitors 38, 44 and provides monitoring results to the controller 42 for use in active port selection. The controller 42 is also preferably implemented in software which is executed by the processor in the working device 31 or the processor in the protection device 34. In some embodiments, both the working device 31 and the protection device 34 perform control functions.

The operation of the system of FIG. 2 will become apparent from the following description of a software-based embodiment of the invention.

Figure 3:
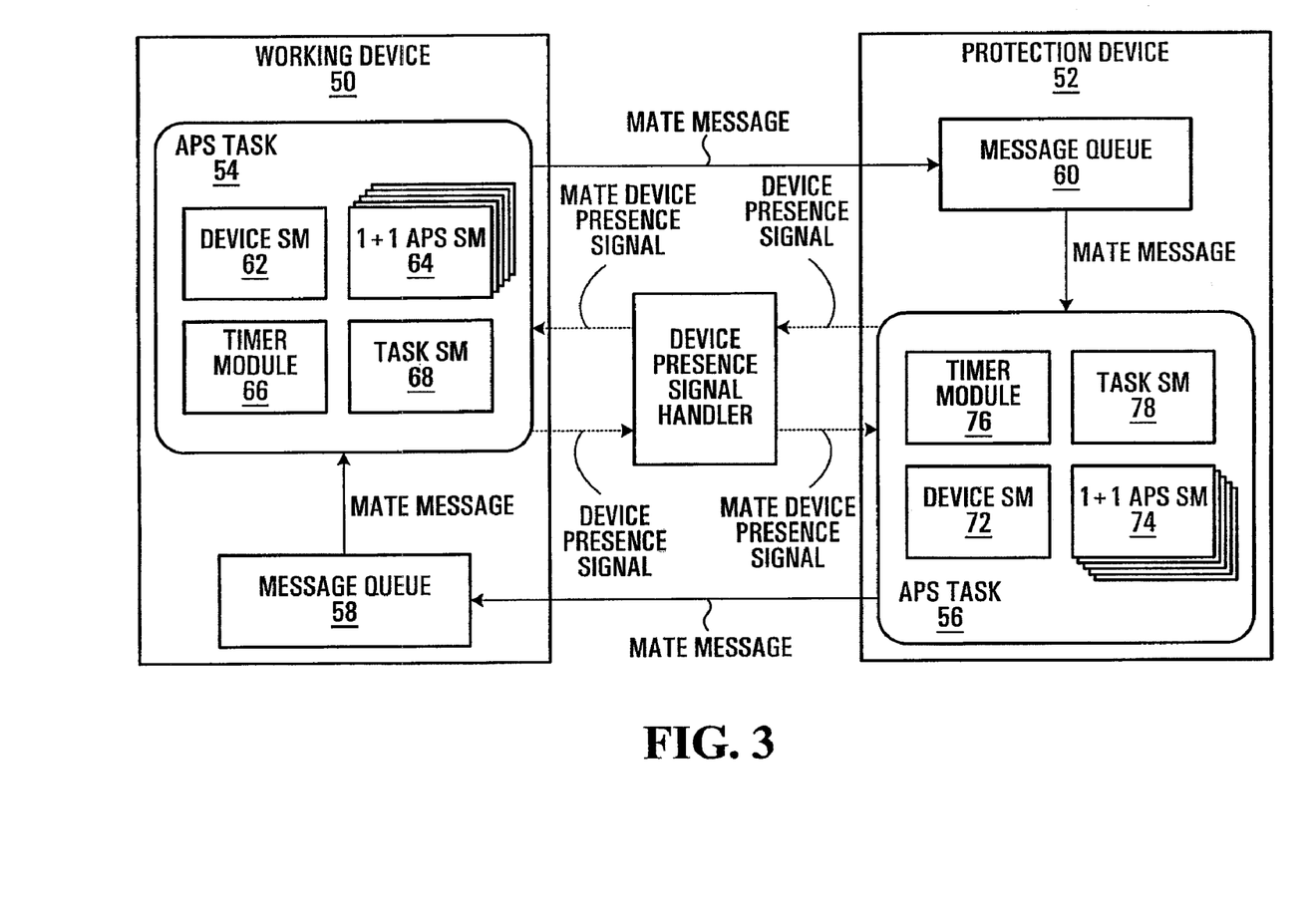
FIG. 3 is a block diagram of a software model of a protection switching system according to another embodiment of the invention.

FIG. 3 is a block diagram of a software model of a protection switching system according to another embodiment of the invention. As shown, protection switching according to an embodiment of the invention is modeled as a single task, the APS task 54, 56, which implements a number of state machines. One instance of the APS task 54, 56 is present on each of the working device 50 and the protection device 52.

Interface activity is controlled using an interface selection or activity control protocol, based on inter-task messages labelled as mate messages in FIG. 3. Mate messages received by a device are added to a message queue 58, 60 on the device and processed as described in further detail below. The message queues 58, 60 are maintained in a memory component such as a memory chip on the working device 50 and the protection device 52.

Each APS task 54, 56 on a device drives a "device present" signal which is monitored by the APS task on the other device. This signal is an indication of whether or not the device is present and available, or "alive". If the signal is high, then the device is not alive and the interfaces on the device are guaranteed not to be active. If the signal is low, then the device is alive, the interfaces on the device may be active, and interface activity must be negotiated using mate messages. In some embodiments, another predetermined signal level indicates that a mate device is not present.

The APS tasks 54, 56 include respective device state machines (SMs) 62, 72, one 1+1 APS SM 64, 74 per interface, timer modules 66, 76, and task SMs 68, 78.

Each device SM 62, 72 is responsible for equipment or device-based protection. It monitors the health of the various hardware components on the device and may rate the health of the device using a demerit system, for instance. In one embodiment, the device SM 72 on the protection card 52 processes the device demerits from both devices and causes activity to be switched to the healthiest device. When a device is active, it includes the preferred paths for traffic, such as traffic traveling between interfaces and switching fabric where the device is a line card in a switch, for example. Referring back to FIG. 2, it will be apparent that the device SMs 62, 72 provide device-level monitoring, control, and switching functions that may be associated with the monitors 38, 44, the controller 42, and the selector 40.

A device SM 62, 72 monitors the health of a device, monitors the health of a mate device, sends the mate message, and monitors and controls device activity. Thus, the device SMs 62, 72 handle functionality and control on a device level.

Figure 4:
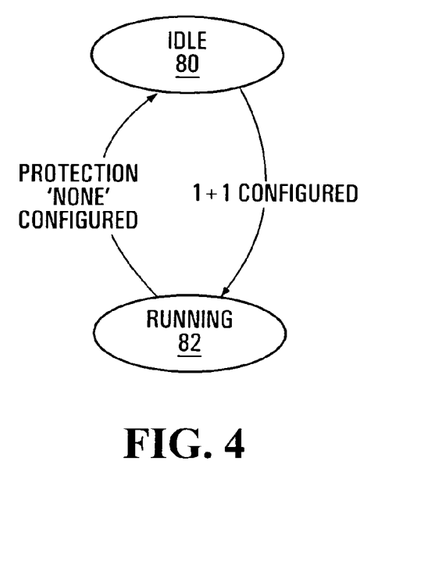
FIG. 4 is a state diagram for a device state machine according to an embodiment of the invention.

FIG. 4 shows a state diagram for the device SMs 62, 72. As shown, each device SM 62, 72 has two states, idle 80 and running 82.

When protection is not configured for a device, a device SM 62, 72 will be in the idle state 80. While in the idle state 80, the device SM 62, 72 awaits configuration of protection for the device. In one embodiment, the device SM 62, 72 processes configuration events when in the idle state 80. After the device SM 62, 72 detects that protection is configured, such as by detecting a configuration event, a transition is made to the running state 82, and the device SM 62, 72 is fully functional.

Event-based processing will be familiar to those skilled in the art. A user input, for example, may generate an interrupt from which an event is generated and passed to an event handler and then to an appropriate SM for processing. Events are dispatched to SMs by the task SM 68, 78, as described in further detail below. Other types of events for the device SM 62, 72 and the other SMs are also contemplated and are handled in a similar manner.

In the running state 82, a device SM 62, 72 monitors device health. Device health may be indicated using demerit points, for example. A device SM 62, 72 preferably calculates demerit points for the device on which it is running, responsive to device demerit or health events passed to the device SM 62, 72. Although a device SM 62, 72 may determine demerit points and thus health of a mate device from mate messages received from a mate device, demerit points may instead be set for a mate card when the mate card experiences a catastrophic failure such as a reset, for example. Table 1 below provides an illustrative example demerit point scheme.

TABLE 1

| Demerit Points | Description |
|---|---|
| 0 | No faults or problems on the device. |
| 0x0080 | Device is overheated. |

TABLE 1-continued

| Demerit Points | Description |
|---|---|
| 0x8000 | Device is running but does not have all its connections. |
| 0xffff | The device has experienced a catastrophic failure. |

The device SM 62, 72 may also infer mate device health from the absence of mate messages. As described in further detail below, mate messages are preferably sent between APS tasks 54, 56 periodically. If the device SM 62, 72 does not receive a mate message within a pre-defined time, then the device SM 62, 72 assumes that one of the devices is unreachable. In this event, the device SM 62, 72 may perform such error processing operations as attempting to reset the device in which it is implemented or the mate device. To verify that a device is unreachable, the device SM 62, 72 may communicate with another entity such as a control card for the working and protection devices. If communications can be established with the other entity, then reset of the mate device may be attempted. Otherwise, the device SM 62, 72 may drive the device present signal high and reset the device in which it is implemented.

The working device 50 may be the normal or default active device. If the protection device SM 72 detects that the protection device 52 is active and the working device 50 is inactive, and the health of the working device is better than or substantially the same as the protection device 52, then the protection device SM 72 releases device activity back to the working device 50. A wait time, illustratively 1 minute, may be provided before activity release to prevent repeated rapid activity switches between the working device 50 and the protection device 52.

The device SM 62, 72 is also responsible for driving and monitoring the device present signal. This signal is an indication of whether or not a device can provide protection. As described above, if the signal is high, then the device cannot provide protection and the interfaces on the device are not active and cannot be made active. If the signal is low, then the interfaces on the device may be active and interface activity must be negotiated using the mate message.

The 1+1 APS SMs 64, 74 provide protection for a pair of interfaces, and thus effectively separate equipment or device-based protection from 1+1 APS functionality. One 1+1 APS SM 64, 74 is provided on each device 50, 52 for each interface on the device, and each 1+1 APS SM 64, 74 controls interface activity for a corresponding interface. An active interface is the preferred path for traffic. In a line card, for instance, an active interface is the preferred path for data traveling between a line and switching fabric. It should be appreciated that in a per-interface protection scheme in accordance with an embodiment of the invention, an active interface need not necessarily be on an active device. For example, an interface or line failure associated with a particular interface on an active device may cause an interface activity switch without a device activity switch. In this case, an active interface is on an inactive device.

Figure 5:
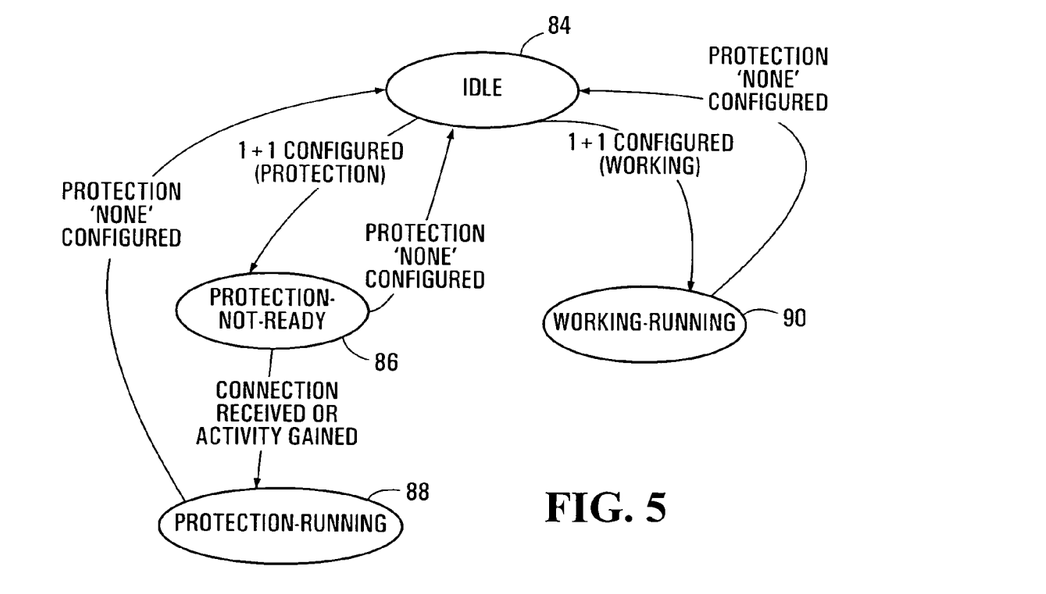
FIG. 5 is a state diagram for an APS state machine according to an embodiment of the invention.

A state diagram for an APS SM 64, 74 is shown in FIG. 5. When protection is not configured, an APS SM 64, 74 will be in the idle state 84. In this state, the SM waits for a protection configuration event or message and may store any other configuration information it receives.

Each APS SM 64 on the working device 50 transitions to the working—running state 90 after protection is configured and interface connection information for the device is complete.

On the protection device 52, the APS SMs 74 transition to the protection—not ready state 86 after protection is configured. While in this state, the APS SMs 74 are waiting for a download of interface connection information corresponding to that of the working device to complete.

The APS SMs 74 on the protection device 52 transition to the protection—running state 88 when the connection download completes. Transition to the protection—running state 88 will also be made if a protection interface or the protection device 52 becomes active.

An APS SM has two modes of operation, a protection mode and a working mode. In one embodiment, the APS SMs 74 on the protection device run in the protection mode, and communicate 1+1 APS protocol information, in a SONET or SDH header on a protection line, for example, to far- or tail-end devices or nodes.

The APS SMs 64 preferably operate in the working mode, and thus do not communicate 1+1 APS protocol information. In the working mode, an APS SM 64 communicates the status of its associated interface to the APS SM 74 of the corresponding protection interface, monitors the activity of the working interface, and releases its activity if told to do so by the APS SM 74.

Since 1+1 APS is only available when a protection device is present, it may be generally preferred to run the APS SMs 74 and not the APS SMs 64 in the protection mode. However, it should be appreciated that in other embodiments of the invention, the APS SMs 64 may be operated in protection mode.

The timer modules 66, 76 provide timer services for the APS tasks 54, 56 and the SMs. Some of the protection switching functions described in further detail below use timing signals provided by the timer modules 66, 76. However, it should be appreciated that the timer modules 66, 76 need not be provided in every embodiment of the invention. For example, timer modules might not be necessary for some device operating systems or communication protocols.

Figure 6:
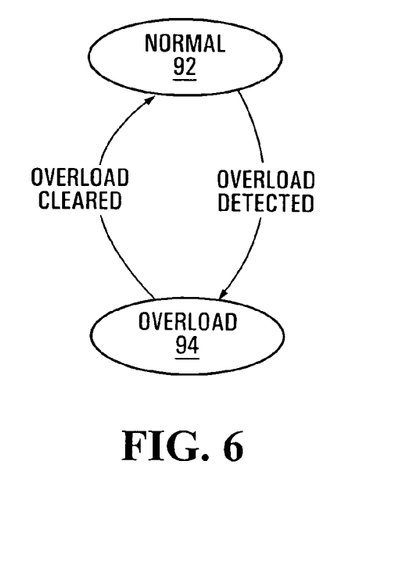
FIG. 6 is a state diagram for a task state machine according to an embodiment of the invention.

The task SMs 68, 78 dispatch events and messages to the other SMs and thus handle task load control. FIG. 6 is a state diagram for a task SM 68, 78 according to an embodiment of the invention. The task SM state diagram of FIG. 6 includes two states, normal state 92 and overload state 94, which represent task SM load control behaviour. However, other task level functions, such as the creation of the other SMs and the timer modules 66, 76, and handling of timer events, may also be performed by the task SMs 68, 78.

Load control by the task SMs 68, 78 mitigates the effects of receiving events or messages at a very high rate, due to an intermittent line failure or malicious behaviour of a far end interface. To prevent a device from being overwhelmed by too many events, which are typically generated in response to interrupts, an interrupt may be disabled after an event for the APS task 54, 56 has been generated for that interrupt. The task SMs 68, 78 are responsible for disabling and subsequently re-enabling an interrupt after processing the event.

In the event of a high rate of interrupts and events, the APS task 54, 56 may consume too much processing power and prevent other tasks from running. To address this problem, the task SMs 68, 78 preferably count the number of events processed, and determine whether a limit has been exceeded. The number of events may be a total number of events per device, or a number of events per interface, for example.

When the number of events exceeds the limit, a task SM 68, 78 transitions to the overload state 94, and inserts a task delay on one or more periodic timer events, such as an APS task iteration timer. This task delay allows other tasks to run, even when APS task events are received at a high rate.

In accordance with an embodiment of the invention, in order to keep inter-task messaging simple and efficient, the only message transferred between the APS tasks 54, 56 is the mate message. Each mate message includes interface-specific fields to identify status and negotiate activity of the interfaces, as well as fields for indicating device activity and demerits. Although a presence signal is also driven by each device, the presence signal is simply an indicator of device presence and current interface activity. Mate messages provide for transfer of more detailed activity and health information, as well as activity negotiation, between the devices 50, 52.

Mate messages are preferably transmitted at periodic intervals, illustratively every 2 seconds, to ensure that mate device information is kept current. The absence of a mate message may then also be used to infer that either a device or its mate device is experiencing problems.

During an iteration of the APS task 54, 56, each SM performs its processing and fills in its information in the mate message. In order to reduce signalling between the APS tasks 54, 56, the mate message transmission interval may be longer than an iteration time of the APS task 54, 56. However, in a preferred embodiment, any SM may trigger a substantially immediate transmission of a mate message instead of waiting for the periodic interval. A mate message, or the device and interface information included therein, may be stored at a device so that information relating to a device and its interfaces is available at the device. Since a protection device may compare its own device health information to that of a working device, for example, at least device health information for a protection device is preferably stored at the protection device.

A mate message may be sent substantially immediately in response to a request from an SM to send a mate message. Alternatively, an early mate message transmission may be accomplished, for example, through the device SM 62, 72. An SM informs the device SM 62, 72 that the mate message should be sent, and the mate message is then sent on the next iteration of the APS task 54, 56. This avoids sending multiple mate messages responsive to requests from multiple SMs during an APS task iteration, which would typically add milliseconds of processing delay. Sending of a mate message on a next task iteration introduces a much shorter processing delay, on the order of microseconds.

Figure 7:
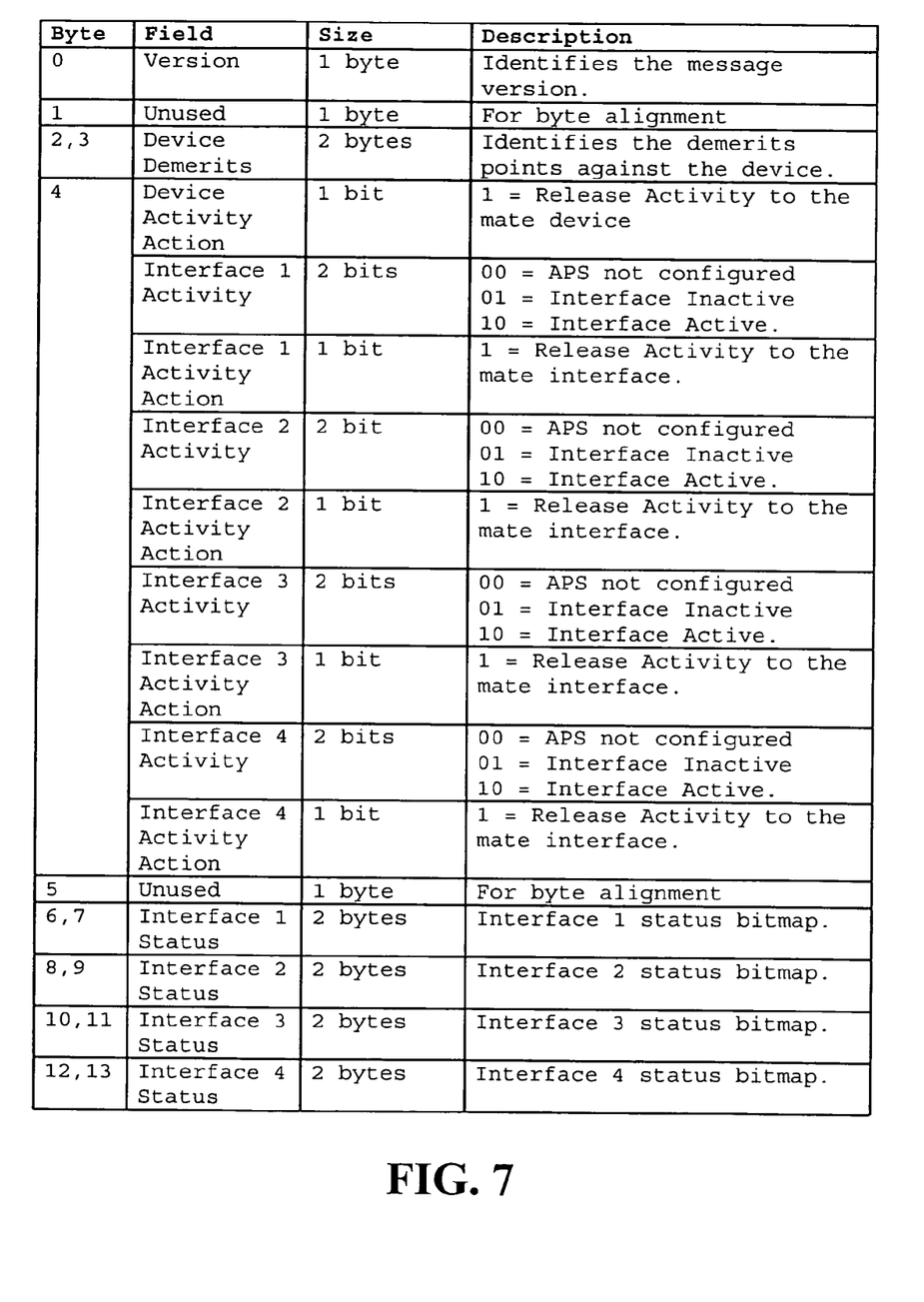
FIG. 7 is an illustrative example of a mate message definition according to an embodiment of the invention.

FIG. 7 is an illustrative example of a mate message definition according to an embodiment of the invention. The example mate message definition shown in FIG. 7 provides for transfer of device demerit points, which are indicative of device health, and per-interface activity, activity action, and status information for each of four interfaces between APS tasks 54, 56. It should be apparent that mate messages may include further, fewer, or different fields than shown in FIG. 7. Additional fields may be provided where further information is to be communicated for controlling device and interface activity, for example. For devices with less than four interfaces, fewer fields may be provided for mate messages. Protection switching may also be based on different device or interface information, in which case different field definitions may be used. The invention is in no way limited to the mate message definition in FIG. 7.

In order to provide efficient protection switching and minimize down time, each APS task 54, 56 preferably processes a mate message when it is received from a mate device.

The decision for interface activity may be based on the health or status of an interface, the 1+1 APS protocol if any, and the health of the device on which an interface is provided, and controlled using a messaging protocol between the state machines. This protocol preferably ensures that only one of a working interface and its corresponding protection interface is active at any time, and minimizes a time during which neither interface is active, which may occur during an activity switch operation. As will be described in further detail below, the switching protocol may also ensure that communication traffic passes through the healthiest device and interface.

Figure 8:
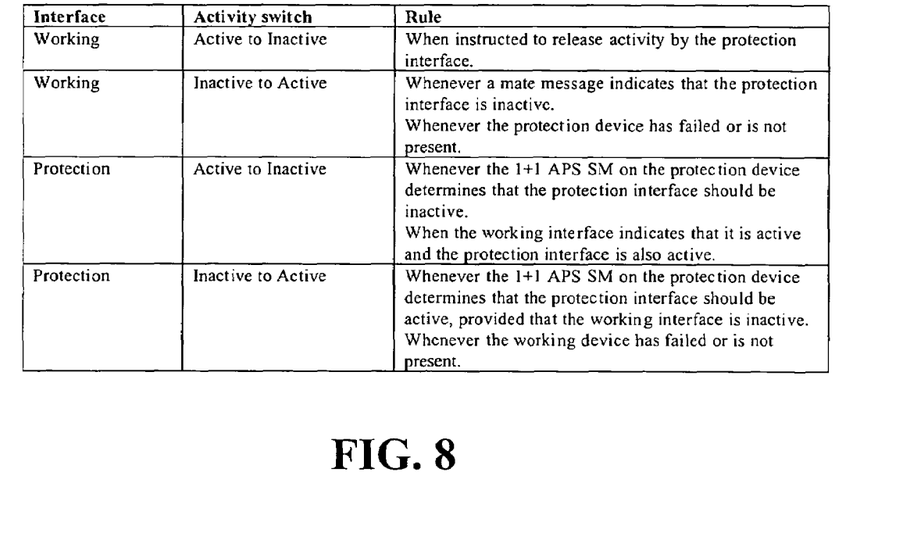
FIG. 8 is an illustrative example of a set of interface activity switching criteria according to an embodiment of the invention.

FIG. 8 is an illustrative example of a set of interface activity switching criteria according to an embodiment of the invention. These criteria are presented solely for illustrative purposes. The invention is in no way limited thereto. Different criteria may be established to control interface activity between working and protection interfaces.

In an embodiment of the invention in which the criteria outlined in FIG. 8 are applied, the 1+1 APS SMs 74 on the protection device 52 make the decision on interface activity. Each of the 1+1 APS SMs 64 on the working device 50 releases interface activity for its corresponding interface when instructed to do so, using an activity action bit in the mate message of FIG. 7, for example. The working interface becomes active if the protection interface is inactive, in the event of a protection device failure, or when the protection device is not present. Protection device failure may be detected by a working device, for example, through mate message processing to determine protection device demerit points, or a determination that a mate message has not been received within a predetermined time, such as a multiple of the mate message transmission interval.

A protection interface is switched from active to inactive whenever the 1+1 APS SM 74 on the protection device 52 determines that it should be inactive, or when a mate message indicates that the corresponding working interface is also active. After making the protection interface inactive, the 1+1 APS SM 74 may re-evaluate interface activity and instruct the working interface to release activity if necessary.

An inactive to active protection interface switch is made whenever the 1+1 APS SM 74 on the protection device 52 determines that the protection interface should be active, provided that the corresponding working interface is inactive. A protection interface also becomes active whenever the working interface or device has failed or is not present.

If neither of a working interface and its corresponding protection interface is active, then traffic flow is interrupted. Although periodic transmission of mate messages allows a device to infer that it or its mate device is experiencing problems, the mate message transmission request functionality described above provides for substantially immediate transmission of a mate message and thus reduces traffic flow interruption during activity switching. For example, where a working interface is switched from active to inactive in response to an instruction to release activity to its corresponding protection interface, as shown in the first row of FIG. 8, the APS SM 64 (FIG. 3) preferably requests that a mate message be sent to the protection device 52 immediately. The protection interface is then made active in response to an indication in the mate message that the working interface is not active.

The contents and uses of the demerits field and the various activity and activity action fields in the example mate message format of FIG. 7 will be apparent from the foregoing. The interface status field may be used, for example, to carry status indications such as the following:

| | |
|---|---|
| Section Loss of Signal | 0x0001 |
| Loss of Frame | 0x0002 |
| Line Alarm Indication Signal (AIS) | 0x0004 |
| Signal Fail | 0x0400 |
| Signal Degrade | 0x0800. |

Such status indications allow a device to monitor the status of interfaces of its mate device.

Figure 9:
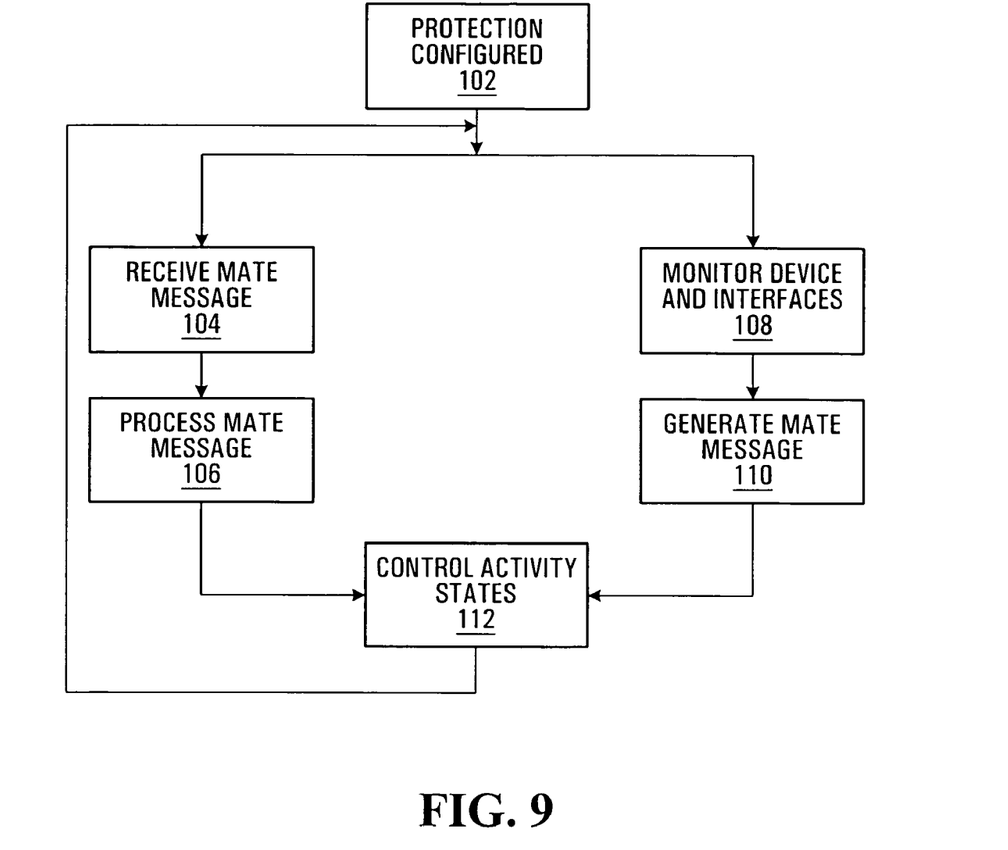
FIG. 9 is a flow diagram of a method according to an embodiment of the invention.

FIG. 9 is a flow diagram of a method 100 according to an embodiment of the invention. When protection has been configured for a device as described above at 102, the device and a mate device are monitored. A mate message received at 104 is processed at 106 to determine mate device information and mate interface information. The device and its own interfaces are also monitored at 108, a mate message is generated and possibly transmitted to the mate device at 110, and the method proceeds to 112, where activity states of the interfaces on the device are controlled, on the basis of at least one of device information, interface information, mate device information, and mate interface information, substantially as described above.

It should be appreciated that the method 100 is intended for illustrative purposes, and provides a general representation of a method in accordance with an embodiment of the invention. Variations of the method 100 will be apparent to those skilled in the art. For example, monitoring and mate message processing may be performed in a different order than shown in FIG. 9. In one embodiment, a mate message queue is checked during or after each iteration of an APS task. In another embodiment, mate message reception is handled as an event. It will also be apparent from the foregoing description that the operations shown in FIG. 9 may be somewhat different for working devices and protection devices.

What has been described is merely illustrative of the application of the principles of the invention. Other arrangements and methods can be implemented by those skilled in the art without departing from the spirit and scope of the present invention.

For example, although embodiments of the invention have been described above primarily in the context of switching activity from a working interface to a protection interface, a device may continue to monitor the health of itself, its interfaces, a mate device, and mate device interfaces, and subsequently switch activity as appropriate.

In addition, embodiments of the invention are not intended to preclude other device or interface functions, including other protection switching functions. As those skilled in the art will appreciate, other local and possibly remote events or signals may be used for protection switching, and may be implemented in conjunction with protection switching schemes as disclosed herein. In one such embodiment, a priority ranking may be established for switching criteria or instructions based on a switching criterion type or switching instruction source (local or remote), for instance.

Embodiments of the invention may also be applied to protection groups with more than 1 protected device or card, to provide 1:N protection, for example. With 1:N APS, a protection interface could protect any other working interface on any other card in the protection group.

We claim:

1. A protection switching system for an electronic device having at least one communication line interface, the system comprising:
   a monitor configured to monitor each of the at least one communication line interface, to generate interface information to be periodically sent to a mate electronic device in a protection group to which the electronic device belongs, and to receive mate interface information from the mate electronic device, the mate electronic device having a respective communication line interface corresponding to each of the at least one communication line interface; and
   a controller configured to control activity states of each of the at least one communication line interface based on at least one of the interface information and the mate interface information,
   wherein the monitor is further configured to determine when the mate interface information is not received within a predetermined time, and wherein the controller is further configured to set each of the at least one communication line interface to an active state when the mate interface information is not received within the predetermined time.

2. The system of claim 1, wherein the monitor is further configured to monitor the electronic device, to generate device information to be periodically sent to the mate electronic device, and to receive mate device information from the mate electronic device, and wherein the controller is further configured to control activity states of each of the at least one communication line interface based on at least one of the device information, the interface information, the mate device information, and the mate interface information.

3. The system of claim 2, wherein the monitor is further configured to calculate device demerit points based on monitored conditions of the electronic device, and wherein the device information comprises the calculated device demerit points.

4. The system of claim 2, wherein the device information comprises device activity action information for providing equipment protection.

5. The system of claim 4, wherein the device activity action information indicates whether the mate electronic device is to assume an inactive state.

6. The system of claim 2, wherein the mate electronic device information comprises mate device activity action information, and wherein the controller is further configured to control an activity state of the electronic device based on the mate electronic device activity action information.

7. The system of claim 2, wherein the device information and the mate device information comprise health information indicating monitored health conditions of the electronic device and the mate electronic device, and wherein the controller is configured to control activity of each of the at least one communication line interface such that each interface of the healthiest of the electronic device and the mate electronic device is in an active state.

8. The system of claim 2, wherein the monitor and the controller are implemented as a plurality of state machines.

9. The system of claim 8, wherein the plurality of state machines comprises:
   a device state machine configured to monitor the electronic device and to generate the device information; and
   a respective interface state machine configured to monitor each of the at least one communication line interface and to generate the interface information.

10. The system of claim 9, wherein each interface state machine is further configured to control an activity state of its respective one of the at least one communication line interface.

11. The system of claim 9, wherein the device state machine is further configured to periodically send the device information and the interface information to the mate electronic device at predetermined intervals.

12. The system of claim 9, wherein the device state machine is further configured to send the device information and the interface information to the mate electronic device responsive to requests from any interface state machine.

13. The system of claim 12, wherein each interface state machine is configured to request sending of the device information and the interface information when an activity state of its respective one of the at least one communication line interface is changed.

14. The system of claim 9, wherein the plurality of state machines further comprises a task state machine configured to dispatch the mate device information and the mate interface information to the device state machine and each interface state machine.

15. The system of claim 14, wherein the task state machine is further configured to dispatch events to the device state machine and each interface state machine.

16. The system of claim 1, wherein the interface information comprises at least one of: interface activity state information indicating an activity state of each of the at least one communication line interface, activity action information indicating whether the respective communication line interface corresponding to each of the at least one communication line interface is to assume an inactive state, and interface status information indicating monitored conditions of each of the at least one communication line interface.

17. The system of claim 1, wherein the mate interface information comprises mate interface activity state information indicating an activity state of each respective communication line interface.

18. The system of claim 17, wherein the controller is configured to set to an active state each of the at least one communication line interface for which the mate interface information indicates that the corresponding respective communication line interface is in an inactive state.

19. The system of claim 17, wherein the controller is configured to set to an inactive state each of the at least one communication line interface for which the mate interface information indicates that the corresponding respective communication line interface is in an active state.

20. The system of claim 1, wherein the mate interface information comprises mate interface activity action information indicating whether the communication line interface corresponding to each respective communication line interface is to assume an inactive state.

21. The system of claim 20, wherein the controller is configured to set to an inactive state each of the at least one communication line interface which the mate interface activity action information indicates is to assume an inactive state.

22. The system of claim 1, wherein the mate interface information comprises mate interface status information indicating monitored conditions of each respective communication line interface.

23. The system of claim 1, wherein the monitor is further configured to detect presence of the mate device, and wherein controller is further configured to set each device interface to an active state where the mate device is not present.

24. The system of claim 1, wherein the electronic device is a line card for a switch in a communication network.

25. A protection switching system for a working electronic device having a plurality of working communication line interfaces and a protection electronic device having a plurality of protection communication line interfaces for respectively protecting the plurality of working communication line interfaces, the system comprising:
a working device monitor configured to monitor each of the plurality of working communication line interfaces, and to periodically send working interface information to the protection electronic device;
a protection device monitor configured to monitor each of the plurality of protection communication line interfaces, and to periodically send protection interface information to the working electronic device; and
a controller configured to select as active interfaces one of each respective pair of the plurality of working communication line interfaces and corresponding protection communication line interfaces based on at least one of the working interface information and the protection interface information, and to set each working communication line interface to an active state when the protection interface information is not received from the protection electronic device within a predetermined time.

26. The system of claim 25, wherein the working device monitor is further configured to monitor the working electronic device and to periodically send working device information to the protection electronic device, wherein the protection device monitor is further configured to monitor the protection electronic device to periodically send protection device information to the working electronic device, and wherein the controller is further configured to select active interfaces based on at least one of the working device information, the working interface information, the protection device information, and the protection interface information.

27. The system of claim 25, further comprising:
a selector controlled by the controller and connected to the plurality of working communication line interfaces and the plurality of protection communication line interfaces.

28. The system of claim 25, wherein the working device monitor is implemented in the working electronic device, and wherein the protection device monitor is implemented in the protection electronic device.

29. The system of claim 25, wherein the controller is implemented in the working electronic device.

30. A protection switching method for an electronic device having at least one communication line interface, comprising:
monitoring each of the at least one communication line interface;
generating interface information to be periodically sent to a mate electronic device in a protection group to which the electronic device belongs, the mate electronic device having a respective communication line interface corresponding to each of the at least one communication line interface;
receiving mate interface information periodically sent from the mate electronic device to the electronic device;

controlling activity states of the at least one communication line interface based on at least one of the interface information and the mate interface information; and
determining when the mate interface information is not received within a predetermined time,
wherein controlling comprises setting the at least one communication line interface to an active state when the mate interface information is not received within the predetermined time.

31. The method of claim 30, further comprising:
monitoring the electronic device;
generating device information to be periodically sent to the mate electronic device; and
receiving mate device information periodically sent from the mate electronic device to the electronic device,
wherein controlling comprises controlling activity states of the at least one communication line interface based on at least one of the device information, the interface information, the mate device information, and the mate interface information.

32. The method of claim 31, wherein generating device information comprises calculating device demerit points based on monitored conditions of the electronic device.

33. The method of claim 31, further comprising:
controlling a device activity state based on at least one of the device information and the mate device information.

34. The method of claim 31, wherein the device information comprises activity control information for controlling an activity state of the mate electronic device.

35. The method of claim 30, wherein the interface information comprises activity control information for controlling activity states of each respective communication line interface.

36. A computer-readable medium storing computer-readable instructions which when executed perform the method of claim 30.

37. An electronic device comprising:
a plurality of communication line interfaces;
a processor; and
a computer-readable medium storing instructions for instantiating a plurality of state machines, the plurality of state machines comprising:
a device state machine configured to monitor the electronic device, to generate device information, and to control an activity state of the electronic device; and
a plurality of interface state machines configured to respectively monitor the plurality of communication line interfaces and to generate interface information,
wherein the device state machine is further configured to:
generate and periodically send mate messages comprising the device information and the interface information to a mate electronic device, the mate electronic device having a plurality of communication line interfaces corresponding to the plurality of communication line interfaces of the electronic device;
receive from the mate electronic device mate messages comprising mate device information and mate interface information; and
control an activity state of the electronic device based on at least one of the device information and the mate device information, and
wherein each of the plurality of interface state machines is further configured to:
control activity states of a corresponding one of the plurality of communication line interfaces of the electronic device based on at least one of the device information, the interface information, the mate device information, and the mate interface information, and to set the plurality of communication line interfaces of the electronic device to an active state when the mate interface information is not received from the protection electronic device within a predetermined time.

38. The electronic device of claim 37, wherein the device state machine is further configured to send the mate messages to the mate electronic device responsive to requests from any of the plurality of interface state machines.

39. The electronic device of claim 37, wherein the plurality of state machines further comprises a task state machine configured to dispatch the received mate messages to the device state machine and the plurality of interface state machines.

40. The electronic device of claim 37, wherein the plurality of state machines further comprises a timer module for providing timer services to the device state machine and the plurality of interface state machines.

41. A communication switch comprising the electronic device of claim 37.

42. The communication switch of claim 41, further comprising the mate electronic device.

* * * * *